United States Patent
Takase et al.

(10) Patent No.: US 7,426,088 B2
(45) Date of Patent: Sep. 16, 2008

(54) MAGNETIC DISK DRIVE WITH FUNCTION ASSIGNMENT AND MANUFACTURING METHOD THEREFOR

(75) Inventors: Makoto Takase, Kanagawa (JP);
Minoru Hashimoto, Kanagawa (JP);
Kenji Okada, Kanagawa (JP); Keishi Takahashi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 31 days.

(21) Appl. No.: 11/355,824

(22) Filed: Feb. 15, 2006

(65) Prior Publication Data

US 2006/0187565 A1 Aug. 24, 2006

(30) Foreign Application Priority Data

Feb. 22, 2005 (JP) .............................. 2005-045213

(51) Int. Cl.
*G11B 19/02* (2006.01)
(52) U.S. Cl. ....................................................... 360/69
(58) Field of Classification Search ........................ None
See application file for complete search history.

(56) References Cited

U.S. PATENT DOCUMENTS

| | | | | |
|---|---|---|---|---|
| 4,590,557 A | * | 5/1986 | Lillie | 713/1 |
| 5,448,429 A | * | 9/1995 | Cribbs et al. | 360/75 |
| 5,541,784 A | * | 7/1996 | Cribbs et al. | 360/75 |
| 7,209,312 B1 | * | 4/2007 | Sutardja | 360/77.07 |
| 2004/0179285 A1 | | 9/2004 | Ogasawara et al. | |

FOREIGN PATENT DOCUMENTS

JP 60-251570 12/1985

* cited by examiner

*Primary Examiner*—K. Wong
(74) *Attorney, Agent, or Firm*—Townsend and Townsend and Crew LLP; Patrick Duncan (57) ABSTRACT

Embodiments of the invention provide a disk drive that may perform part of a function assignment process without being connected to a special test apparatus. In one embodiment, servo data is written only into dedicated regions of a disk. A function assignment program is stored within the dedicated regions. When a processor is powered on, the processor refers to a state setter and judges whether the function assignment program is to be executed. The state setter is constituted by a nonvolatile memory or a jumper block. The function assignment program includes data relating to servo data writing based on a self-servo writing scheme, and data relating to parameter setup.

20 Claims, 5 Drawing Sheets

MAGNETIC DISK DRIVE WITH FUNCTION ASSIGNMENT AND MANUFACTURING METHOD THEREFOR

CROSS-REFERENCES TO RELATED APPLICATIONS

This application claims priority from Japanese Patent Application No. JP2005-045213, filed Feb. 22, 2005, the entire disclosure of which is incorporated herein by reference.

BACKGROUND OF THE INVENTION

The present invention relates to techniques for, after hardware has been assembled into a magnetic disk drive, assigning functions to the magnetic disk drive to make it operative as a finished product. More particularly, the invention relates to a technique for performing a part or parts of the process of assigning functions to a magnetic disk drive, without using a special test apparatus.

After having their hardware assembled inside, magnetic disk drives undergo function assignment operations such as writing servo data onto magnetic disks and setting parameters relating to magnetic heads and data channels or registering magnetic disk defective sectors. The magnetic disk drives are thus made operative as finished products, which are then shipped to users. The process of assigning functions in this manner to finish the manufacture of the magnetic disk drives whose hardware assembly has been completed is referred to as the function assignment process.

In general, the function assignment process for magnetic disk drives is performed with a large number of magnetic disk drives set up in the cells of the test chamber connected to a special test apparatus. The function assignment process includes the operations of sending commands to each magnetic disk drive from the test apparatus, confirming its response, and sending from the test apparatus the test programs to be performed by each magnetic disk drive. Until the function assignment process has been completely performed by the test apparatus, each magnetic disk drive remains installed in the test chamber.

Patent Document 1 (Japanese Patent Laid-Open No. 2004-178744) discloses a technique in which, after a growth program has been sent from an optimized/inspected parent magnetic disk drive to a child magnetic disk drive whose optimizing/inspecting processes are not completed, the child magnetic disk drive performs the optimizing/inspecting processes itself by executing the growth program. It is described that according to this technique, since a grown-up magnetic disk drive can be used as a test apparatus, it is possible to suppress investments in the test apparatus, intended for mass production.

BRIEF SUMMARY OF THE INVENTION

The manufacturers of the host apparatus which uses magnetic disk drives desire that the deadline for the delivery of the magnetic disk drives should be minimized to shorten the manufacturing period of the host apparatus. The manufacturers of magnetic disk drives have hitherto devoted their efforts to expediting the delivery of finished magnetic disk drives to shorten the manufacturing period of the host apparatus. The host apparatus into which a magnetic disk drive is to be built, such as an HDD recorder or a file server, may undergo the operational tests that span a long time. During these operational tests that do not include logic circuit operational tests, storage battery charge/discharge tests, power supply circuit tests, heat-run tests, or other tests involving the operation of the magnetic disk drive, electric power is only supplied from the host apparatus to the magnetic disk drive. However, since the operational tests of the host apparatus are conducted immediately before it is shipped, all assembly process steps for hardware, including those of the magnetic disk drive, must have been completed by the time when the operational tests are started. In such a case, under the conventional method where a finished magnetic disk drive is to be delivered to the manufacturer of its host apparatus, since the host apparatus and the magnetic disk drive have respective manufacturing completed separately, a limit may occur to reduction in the total manufacturing period of the magnetic disk drive and the host apparatus using the disk drive. The need arises here for one to provide a new magnetic disk drive contributive to reduced manufacturing period of such a host apparatus.

Accordingly, a feature of the present invention is to provide a magnetic disk drive that may perform part of its function assignment process without being connected to a special test apparatus. Another feature of the invention is to provide a magnetic disk drive that allows a manufacturing period of a host apparatus to be shortened by shipping the magnetic disk drive with part of its function assignment process remaining unfinished, and then after assembling the magnetic disk drive into the host apparatus, performing a remainder of the function assignment process to complete the magnetic disk drive. Yet another feature of the invention is to provide a method for manufacturing such a magnetic disk drive.

During the function assignment process, various functions are assigned to the magnetic disk drive whose hardware assembly has been completed, and the magnetic disk drive is thus made operative as a finished product. The function assignment process is split into a first stage suitable for execution under the environment where a special test apparatus and an inspection person who has expertise are present, and a second stage executable even under the environment where such a test apparatus and inspection person are absent. The magnetic disk drive is constructed so that the function assignment process steps of the first stage may be performed at a factory and so that the function assignment process steps of the second stage may be performed with the magnetic disk drive assembled into the host apparatus of a user. In addition, a function assignment program is stored into the magnetic disk drive so that the disk drive itself may perform the function assignment process steps of the second stage, and a state setter is provided that allows the user to activate a processor to readily execute the function assignment program, just by turning electric power on.

A first aspect of the present invention provides a magnetic disk drive including: a magnetic disk having a region in which servo data is already written, and a region in which servo data is not written, and storing a function assignment program into the region where servo data is already written; a magnetic head for accessing the magnetic disk; a processor for executing the function assignment program; and a state setter for setting up states for the processor to judge whether it is to execute the function assignment program when electric power is supplied to the processor.

The magnetic disk is constructed to have a region in which servo data is already written, and a region in which servo data is not written. The function assignment program is stored into the region where servo data is already written. This region may be either a special region inaccessible to the user, or a general region accessible to the user. The processor within the magnetic disk drive executes the function assignment program and performs a function assignment process on the processor itself. Allocating a specific address to the state setter by using an initial operating program constructed in order for the processor to refer to the allocated address when powered on makes it possible for the processor to execute the function assignment program according to a particular setting of the state setter when power is supplied to the processor.

The state setter may be constructed as a jumper block or a nonvolatile memory. An execution environment for the function assignment program may be easily formed by connecting to a jumper connector a jumper block for which states are previously set. When a nonvolatile semiconductor memory is used, its states may be set from the test apparatus or by executing the function assignment program. If the processor is adapted to operate in a device mode according to a particular setting of the state setter when the processor is powered on, control may be easily changed to the magnetic disk drive operating as a finished product after completion of the function assignment process.

When a nonvolatile semiconductor memory is used as the state setter, it is easier to handle than a jumper block. The function assignment program may include a program for writing servo data with a self-servo writing scheme, a program for registering defective sectors of the magnetic disk, and a program for setting read/write channel parameters.

The magnetic disk drive according to the first aspect of the present invention is adapted to perform the function assignment process by executing the function assignment program stored within the magnetic disk. A manufacturing period of the magnetic disk drive according to the present aspect may be made shorter than that of the magnetic disk drive operating as a finished product after the function assignment process has been performed, by an execution period of the function assignment process. If the magnetic disk drive according to the present aspect is formed as a finished product by executing the function assignment program concurrently with operational tests of the host apparatus after assembling the magnetic disk drive thereinto, when delivery of the magnetic disk drive is a critical path for a manufacturing period of the host apparatus, the operational tests thereof may be started earlier than in a method that involves assembling the magnetic disk drive as a finished product.

A special test apparatus and inspection person for the magnetic disk drive cannot be provided under an operational test environment for the host apparatus. However, if the state setter is provided and the processor is adapted to execute the function assignment program when the processor is powered on, the function assignment process for the magnetic disk drive may be performed, even after it has been assembled into the host apparatus.

For early recovery of the investments in the test apparatus, it is desirable that the time during which each magnetic disk drive occupies a test chamber should be made as short as possible. According to the present aspect, however, since part of the function assignment process may be performed even without connection to the test apparatus, the test apparatus and the test chamber improve in availability ratio.

A second aspect of the present invention provides a magnetic disk drive including: a magnetic disk, a magnetic head for accessing the magnetic disk, a nonvolatile semiconductor memory for storing a function assignment program, a processor for executing the function assignment program, and a state setter for setting up states for the processor to judge whether it is to execute the function assignment program when electric power is supplied to the processor.

In the present aspect, the function assignment program is stored in the nonvolatile semiconductor memory and even when electric power to the magnetic disk drive is shut off, a stored condition of the function assignment program is ensured. The magnetic disk, therefore, may already have servo data written on all its recording surfaces, may have no servo data written on either of its recording surfaces, or may have servo data written only on part of its recording surfaces.

A third aspect of the present invention provides a manufacturing method for a magnetic disk drive, the manufacturing method including the steps of: assembling into a host apparatus the magnetic disk drive equipped with a recording medium having a function assignment program stored thereon, and with a processor for executing the function assignment program; powering on the host apparatus and testing it for operation; and activating the processor to execute the function assignment program in at least one part of a period during which the host apparatus is being tested for operation.

According to the present aspect, an overlapping period exists between the execution of the function assignment program and operational tests of the host apparatus. When the operational tests of the host apparatus are to be started following completion of assembling a finished magnetic disk drive into the host apparatus, completion of the manufacture of the magnetic disk drive must be awaited before the operational tests may be started. According to the present aspect, however, if the magnetic disk drive is completed before the function assignment program is executed, it is possible to assemble the magnetic disk drive into the host apparatus and start the operational tests thereof and thus to reduce the host apparatus in terms of manufacturing period for which the assembly timing of the magnetic disk drive is a critical path. When the function assignment program includes frequency setting for a filter of a read/write channel, the optimum value may be set for a resonance frequency of a servo control system with respect to the overall vibration that includes vibration of the host apparatus.

Thus, the present invention makes it possible to provide a magnetic disk drive that allows part of its function assignment process to be performed without connection to a special test apparatus. The invention also makes it possible to provide a magnetic disk drive whose manufacturing may be completed by shipping the magnetic disk drive with part of its function assignment process remaining unfinished, and then after assembling the magnetic disk drive into a host apparatus, performing a remainder of the function assignment process. In addition, the invention makes it possible to provide a method for manufacturing such a magnetic disk drive.

DETAILED DESCRIPTION OF THE INVENTION

Magnetic disk drive before functions are assigned thereto

Figure 1:
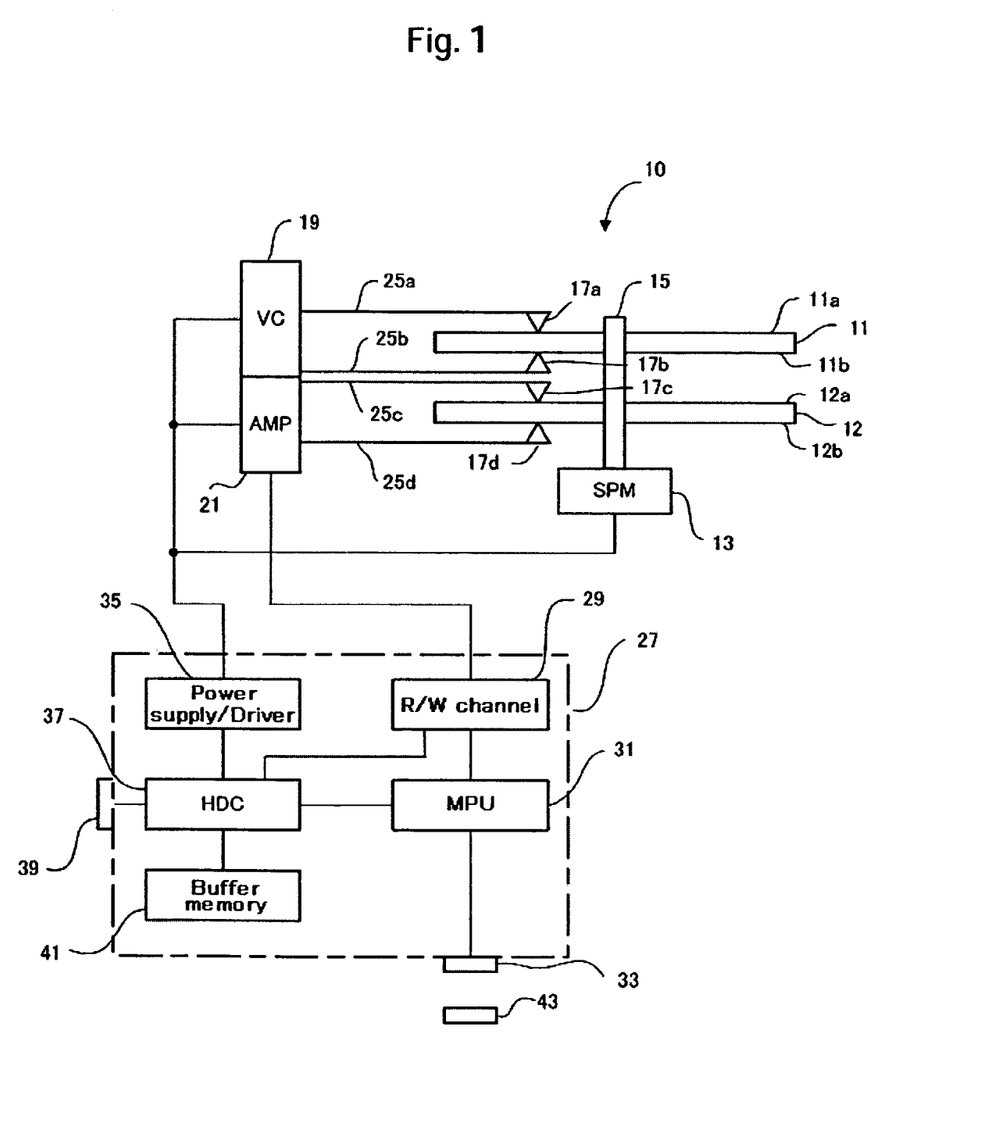
FIG. 1 is a schematic block diagram of a magnetic disk drive according to an embodiment of the present invention.

FIG. 1 is a schematic block diagram of a magnetic disk drive 10 according to an embodiment of the present invention. The magnetic disk drive 10 has its constituent elements mounted on a base in a clean room, and then the base and a base cover are bonded. Two magnetic disks 11, 12 as recording media, have recording surfaces 11a, 11b, and 12a, 12b, respectively. A magnetic layer for recording data is formed on each recording surface, and a protective layer is provided on the surface of the magnetic layer. The magnetic disks 11, 12 are fixed to a spindle 15 at required intervals, and both disks rotate together by means of a spindle motor 13.

Figure 2:
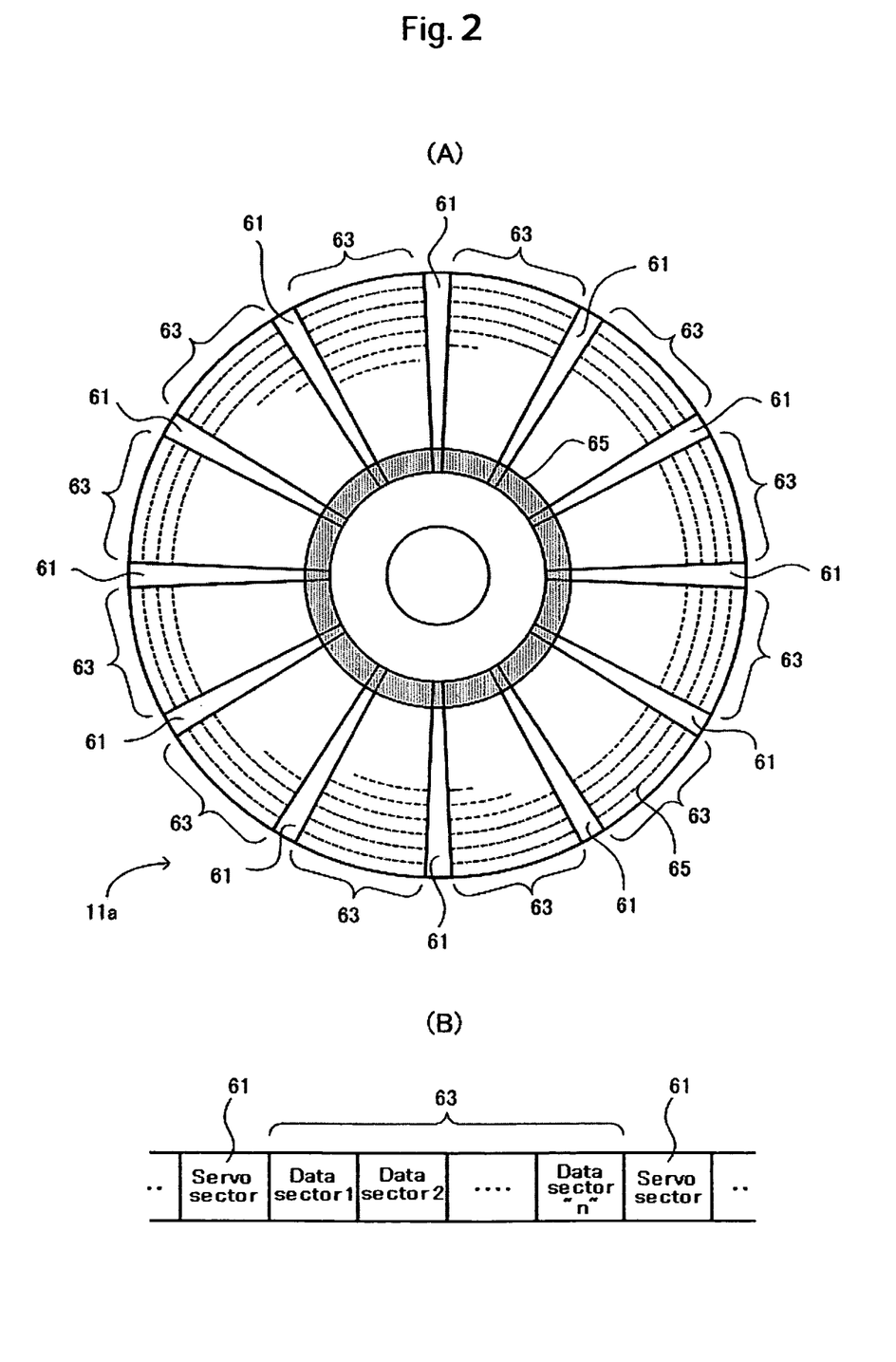
FIGS. 2(A) and 2(B) are diagrams showing a format structure of a magnetic disk according to an embodiment of the present invention.

FIG. 2(A) shows a conceptual format structure of the recording surface 11a of the magnetic disk 11. All other recording surfaces are also of the same format structure as that of the recording surface 11a. Servo sectors 61 are arranged in a radial form in a radial direction of the recording surface 11a, and as shown in FIG. 2(B), data regions 63 each constructed of plural data sectors are provided in such a form that each data region 63 is sandwiched between servo sectors 61. The magnetic disk drive 10 uses a self-servo writing scheme to write servo data. In the self-servo writing scheme, a magnetic head 17a, 17b, 17c, or 17d that is built into the magnetic disk is used to write servo data onto the entire recording surface in a self-propagating format while determining new writing positions with previously written servo data as their reference.

At the time of completion of hardware assembly, however, the magnetic disk drive does not yet have any servo data written on the recording surfaces of the magnetic disks 11, 12. Dedicated regions 65 each including the innermost track are defined internally on the recording surface 11a. The dedicated regions 65 are reserved only for a system of the magnetic disk drive, and these regions are not used to record user data.

As shown in FIG. 1, the magnetic disk device 10 has four magnetic heads, 17a, 17b, 17c and 17d, associated with the recording surfaces 11a, 11b, 12a and 12b, respectively. Each of the magnetic heads is formed with a specific slider, as a dual head that functions as an inductive read head and a GMR write head. During operation, either one of the four magnetic heads is selected so that it will be active for accessing a data sector of the address specified from a host apparatus.

The sliders with which the magnetic heads 17a, 17b, 17c and 17d are formed are installed at head support mechanisms 25a, 25b, 25c and 25d respectively. Each head support mechanism includes a suspension assembly, a carriage, and a voice coil 19. The voice coil 19, together with a base-installed yoke and a yoke-installed magnet, constitutes a voice coil motor. The voice coil 19 rotates each head support mechanism around a pivot and positions each magnetic head at a desired cylinder present on the recording surface of the associated magnetic disk.

The cylinder refers to an annular recording region constituted by tracks of the recording surface 11a, 11b, 12a, or 12b of the magnetic head 17a, 17b, 17c, or 17d when the head is positioned at a desired track. The head support mechanism has a head amplifier 21 connected to the magnetic head at one end and to a read/write channel 29 at another end. The head amplifier 21 includes a read/write driver, a driver register, a read/write selector circuit, and other elements.

The magnetic disk device 10 further has a circuit board 27 on which are mounted the read/write channel 29, an MPU assembly 31, a power supply/driver 35, a hard-disk controller (HDC) 37, and a buffer memory 41. The circuit board 27 is installed outside the base and connected to base-contained elements via terminals or flexible cables. The R/W channel 29 includes a modulation circuit for converting bit strings of data into a format convenient for recording on the magnetic disk, and a demodulation circuit for inverse conversion of the bit strings. The R/W channel 29 further has a parallel/serial converter for conversion between parallel data and serial data, a variable gain amplifier (VGA) for adjusting readout signals to a constant voltage level, and other elements.

The read/write channel 29 includes a data system for processing user data, and a servo system for processing position information on servo data. After servo data and test data have been written onto the magnetic disk, parameters need to be set for the filters and amplifiers that constitute the above two systems. However, parameters are not yet set at the stage where the assembly of hardware has only been completed.

Figure 3:
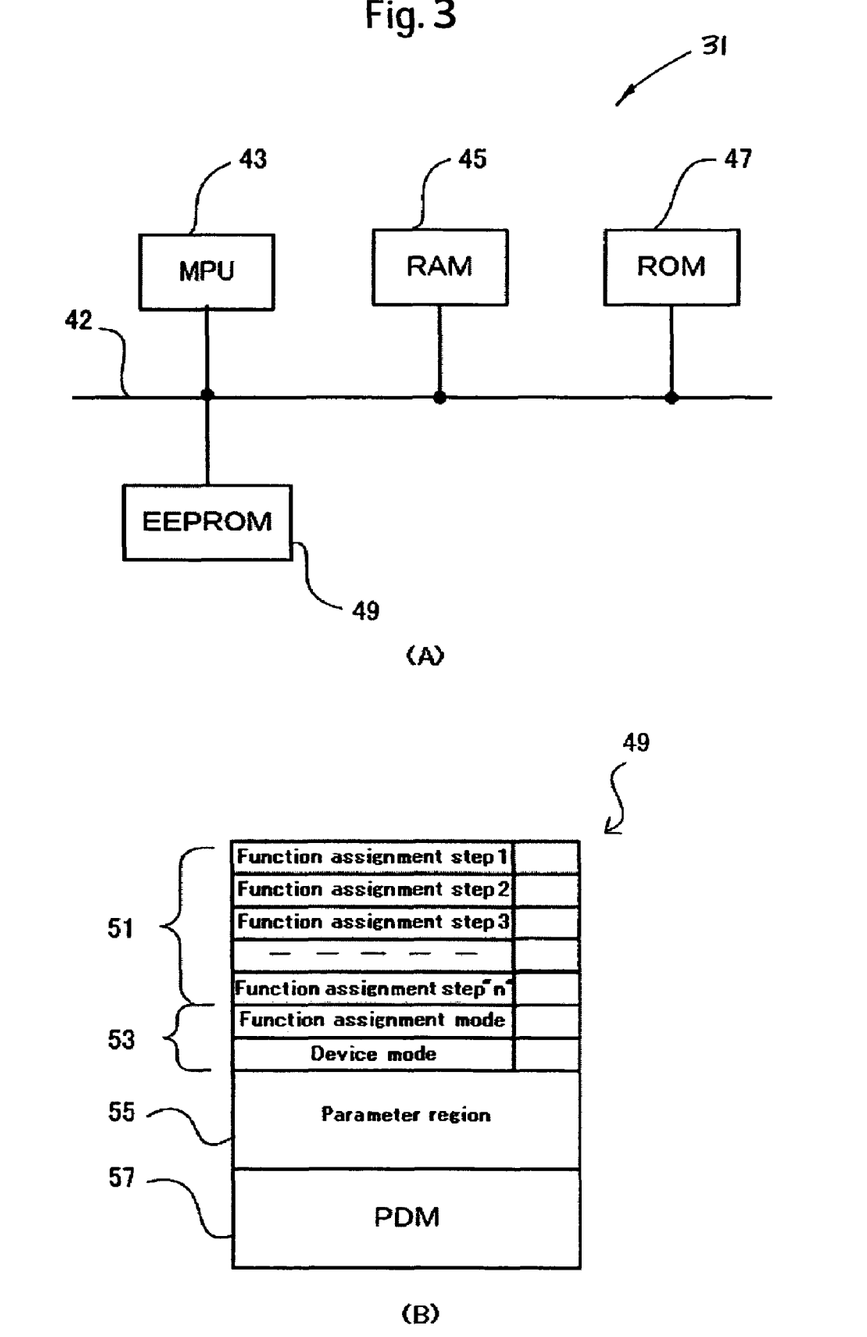
FIGS. 3(A) and 3(B) are diagrams showing a configuration of an MPU assembly according to an embodiment of the present invention.

In the MPU assembly 31, as shown in FIG. 3(A), a microprocessor (MPU) 43, a volatile memory (RAM) 45, a read-only memory (ROM) 47, and an erasable nonvolatile memory (EEPROM) 49 are connected to a bus 42. The MPU 43 conducts total operation control of the magnetic disk drive 10 by executing various programs. The RAM 45 is a memory that the MPU 43 is to use for program execution and/or as a work region. The initial operating program required for the magnetic disk drive to initially operate is stored in the ROM 47. The initial operating program includes a program sent from outside through an interface connector, and a program to be stored into the buffer memory 41 or the EEPROM 49. The MPU 43 initially executes the initial operating program when electric power is supplied to the magnetic disk drive 10.

The MPU 43 performs a function assignment process by responding to a command from a test apparatus or executing a function assignment program transferred therefrom. In the present embodiment, the function assignment program is split into a plurality of steps. As shown in FIG. 3(B), the EEPROM 49 has flag bits 51 arranged in order of execution of each step set in the function assignment program. The flag bits 51 are set up by the MPU 43 when execution of the function assignment program for the respective steps is completed, and initially, neither of the flag bits is set up.

The EEPROM 49 has flag bits 53 for operation mode setup. A function assignment mode and a device mode are available as operation modes. The function assignment mode is intended to execute the function assignment program, and the device mode is intended to operate the magnetic disk drive as a finished product without executing the function assignment program. When power is supplied to the magnetic disk drive 10 or the MPU assembly 31, the initial operating program initially causes the MPU 43 to refer to the flag bits 53 and correspondingly judge a currently valid operation mode.

Firmware and the function assignment program are stored into the buffer memory 41 before the dedicated regions 65 on the magnetic disk become usable, and after the dedicated regions 65 have become usable, the firmware and the function assignment program are stored into the dedicated regions 65. Whether the firmware and the function assignment program are stored within the buffer memory 41 or the dedicated regions 65 may be judged by referring to the flag bits 51 that indicate the steps of the function assignment program.

The MPU 43 executes the initial operating program and when the magnetic disk drive 10 or the MPU assembly 31 is powered on, refers to the flag bits 53. If the function assignment mode is set, the MPU 43 reads the function assignment program and the firmware from the buffer memory 41 or the dedicated regions 65 out into the RAM 45. The MPU 43 further refers to the flag bits 51 and executes the function assignment program for the set steps. When reference is made to the flag bits 53, if the device mode is set, the MPU 43 reads out the firmware into the RAM 45 and operates the magnetic disk drive as a finished product without executing the function assignment program.

The EEPROM 49 has a parameter region 55, into which are stored the parameters required for the magnetic disk drive to perform the function assignment process, and the parameters required for the disk drive to operate in the device mode. The EEPROM 49 also includes a primary defect map (PDM) 57 for registering defects in data sectors. In order to avoid using any defective data sectors present on the magnetic disk, addresses of the defective data sectors are registered in the PDM 57. Data is not recorded at the time of completion of hardware assembly.

As shown in FIG. 1, the HDC 37 includes elements such as: a servo controller that provides control of seek operation and track-following operation, based on the information acquired from servo data; a buffer controller that controls the buffer memory 41, and; an ECC circuit that generates correction bits for errors in the data bits sent from a host computer, or that corrects the user data read out from the magnetic disk. The HDC 37 further has an ATA register to which the host apparatus connected to an interface connector 39 may refer.

The buffer memory 41 is constructed as a DRAM, and is used to implement high-speed data transfer between the host computer and the magnetic disk drive 10. In the present embodiment, however, the buffer memory 41 is also used for temporary storage of the firmware and the function assignment program in order to perform the function assignment process. The power supply/driver 35 is constituted by a spindle motor driver for supplying an operating current to the spindle motor 13, a voice coil motor driver for supplying an operating current to the voice coil 19, a DA converter, a power supply circuit, and other elements.

The interface connector 39 for connecting the magnetic disk drive 10 to the host apparatus, and a jumper connector 33 for setting the operation modes of the magnetic disk drive are installed on the circuit board 27. The jumper connector 33 is adapted to allow connection of a jumper block 43 thereto. The jumper block 43 provides electrical strapping between pins of the jumper connector 33 by employing a unique configuration, and sets states to be incorporated into a register of the MPU 43. When power is supplied to the magnetic disk drive 10 or the MPU assembly 31, the initial operating program causes the MPU 43 to refer to the states set using the jumper connector.

Function assignment process

Figure 4:
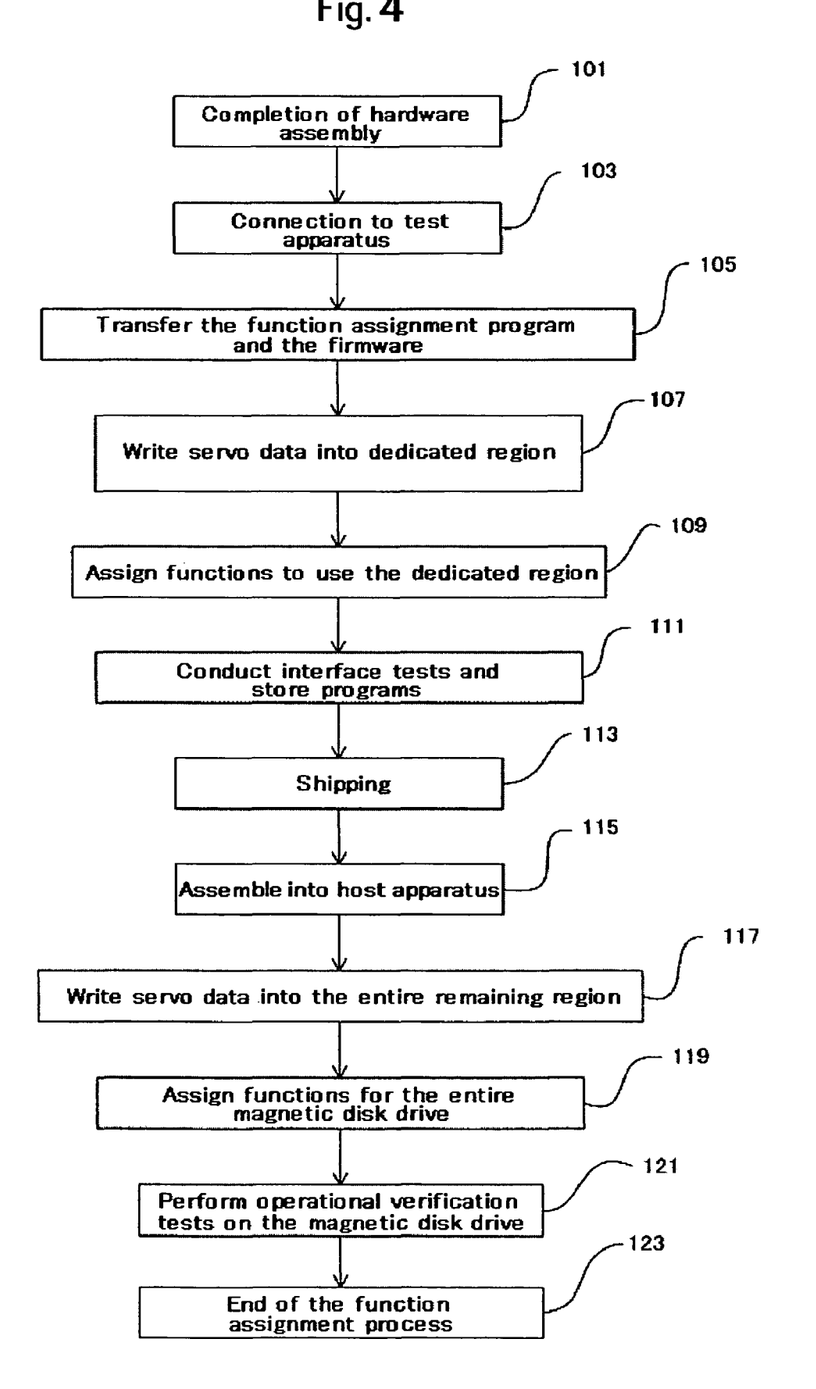
FIG. 4 is a flowchart showing a manufacturing process for the magnetic disk drive according to an embodiment of the present invention.

A method from completion of hardware assembly to assigning functions to the magnetic disk drive 10 by performing the function assignment process is described below referring to a flowchart of FIG. 4. In block 101, in a cleanroom, the magnetic disks 11, 12, the head support mechanisms 25a, 25b, 25c, 25d for recording data on the magnetic disks, and other constituent elements of the magnetic disk drive 10 are installed in the base and then sealed with the base cover. Furthermore, the circuit board 27 is installed outside the base.

The initial operating program is stored in the ROM 47 in order to allow the communication with the outside that is required for execution of the function assignment process. Neither of the flag bits 51, 53 are set up in the EEPROM 49. In addition, parameters are not stored within the parameter region 55 and no data is stored within the PDM 57. The magnetic disks 11, 12 have no servo data written on any recording surfaces, and the magnetic disk drive 10 is only in a finished condition as hardware.

The function assignment process in the present embodiment is split into a first stage suitable for execution under the environment where a special test apparatus and an inspection person who has expertise are present, and a second stage executable even under the environment where such test apparatus and inspection person are absent. Function assignment process steps of the first stage are performed after magnetic disk drives have been assembled into a test chamber connected to the test apparatus, and function assignment process steps of the second stage are performed after the magnetic disk drives have been shipped from a factory and built into the host apparatus.

Figure 5:
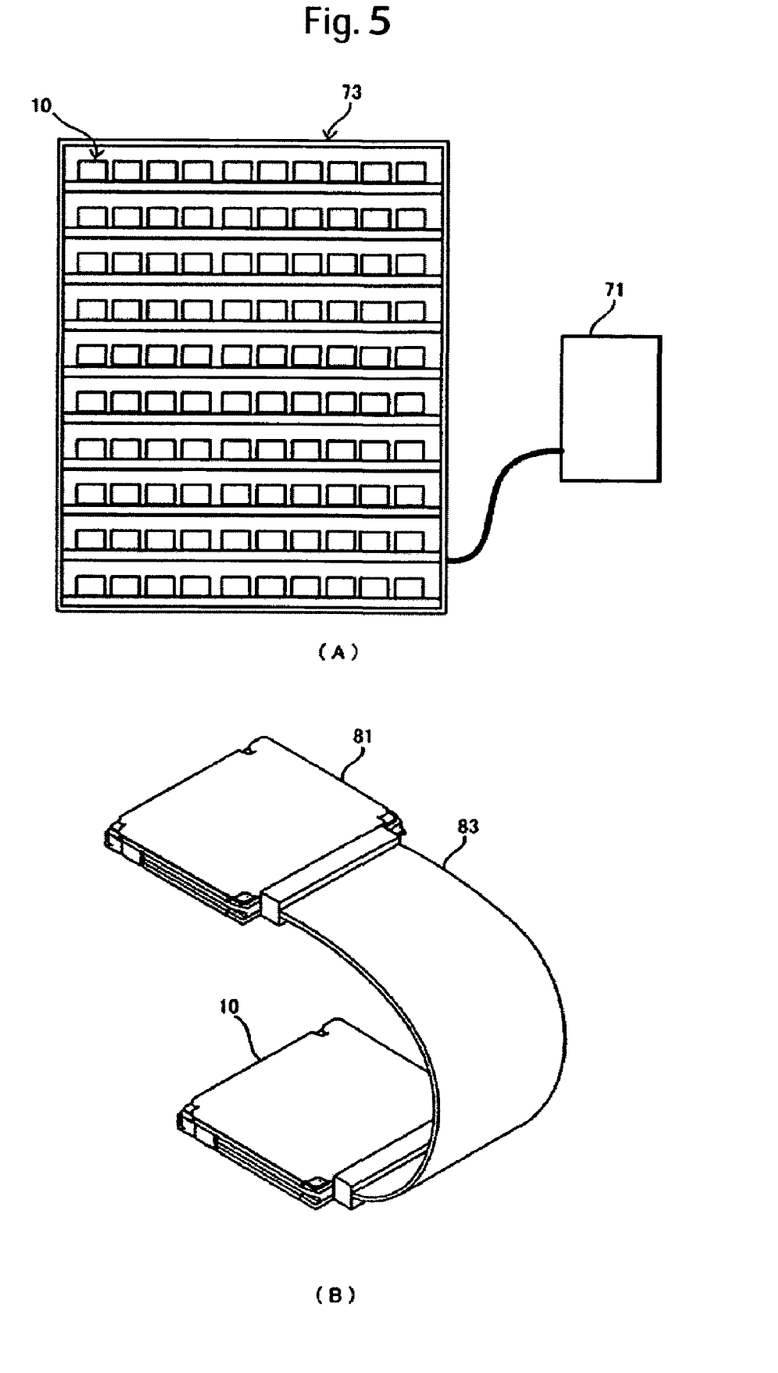
FIGS. 5(A) and 5(B) are diagrams showing a configuration of a test apparatus according to an embodiment of the present invention.

In block 103, magnetic disk drives are connected to a test apparatus. A special test apparatus 71 and a test chamber 73 are shown in FIG. 5(A). The test chamber 73 has a plurality of cells, and each cell has a connector connected to an interface connector 39 of each magnetic disk drive 10. The test apparatus 71 is, for example, a dedicated computer capable of transferring programs to the magnetic disk drive 10 in order to perform the function assignment process, sending commands, and confirming response operation with respect thereto. The test apparatus 71 is not limited to this example and may be such a magnetic disk drive as described in Patent Document 1. More specifically, the test apparatus may be a magnetic disk drive 81 as a finished product connected by a cable 83 as shown in FIG. 5(B).

When power is supplied from each cell of the test chamber 73 to each magnetic disk drive, the initial operating program stored within the ROM 47 is read out into the RAM 45. The MPU 43 is to execute this initial operating program. The test apparatus 71 sends a signal that allocates flag bits 53 to the function assignment mode, and parameters to be stored into the parameter region, to the magnetic disk drive, and the MPU 43 writes the signal and the parameters into the EEPROM 49. These parameters are of the minimum level required for the execution of the function assignment program. Examples include parameters relating to the read/write channel required when servo data is to be written using a self-servo writing scheme, and parameters relating to setup of a writing current for the head/amplifier 21.

In block 105, the firmware for controlling the operation of each magnetic disk drive 10, and the function assignment program that causes the magnetic disk drive to perform the function assignment process are transferred, together with commands, from the test apparatus 71 to the magnetic disk drive. After receiving a command from the test apparatus 71, the MPU 43 executes the initial operating program and stores the transferred firmware and the function assignment program into the buffer memory 41.

After receiving from the test apparatus 71 a command that starts the function assignment process, the MPU 43 refers to the flag bits 51 in the EEPROM 49, recognizes that the bits are not set up, and executes a program of function assignment step 1. In block 107, the MPU 43 executes the function assignment program and writes servo data into the servo sectors 61 of the dedicated regions 65 in order from the respective innermost tracks of the recording surface 11a, toward the respective outermost tracks, by use of a well-known self-servo writing scheme. During this write operation, parameter data that has been stored in the parameter region 55 of the EEPROM 49 is used as the parameters relating to the read/write channel 29 required for servo data writing, and as the parameters relating to the head amplifier 21.

Servo data includes servo AGC data that makes amplitude constant by adjusting an amplification factor of the read/write driver before the servo data is read out, a servo detection mark that indicates the beginning of the servo data, servo address information that includes track numbers and sector numbers, and servo burst information for positioning the magnetic head accurately at a desired track. In order for the magnetic disk drive 10 to become a final finished product, servo data needs to be written entirely onto each of the four recording surfaces of the magnetic disks 11, 12. In block 107, however, servo data is written only into each dedicated region 65 including the innermost track. Therefore, this saves the time spent in writing into each dedicated region 65, compared with the time required for servo data writing onto all recording surfaces. The dedicated regions 65 may also be provided on the recording surfaces 11b, 12a, 12b.

In block 109, the MPU 43 executes the function assignment program, sets the parameters relating to, for example, the read/write channel required for data writing onto and reading out from the dedicated regions 65, and records the parameters in the parameter region 55 of the EEPROM 49. The parameters set up include those relating to operations such as setting a position error signal (PES) gain to obtain continuity of PES between servo tracks, setting the filtering coefficients used for the read/write channel, and registering the information required for servo-data-based calculation of the relationship in position between read and write heads that forms a function of a yoke angle. Furthermore, in block 109, defective sectors are detected by conducting read/write tests on the data sectors of the dedicated regions 65, and the defective sectors have their addresses registered in the PDM 57 of the EEPROM 49 so that these sectors will not be used. Alternately, the PDM 57 may be provided in a dedicated region 65.

In block 111, an interface circuit is tested in such a format that when the MPU 43 sends commands from the test apparatus 71 to the magnetic disk drive 10, this magnetic disk drive responds to the commands. In addition, the MPU 43 executes the function assignment program and moves the function assignment program and the firmware from the buffer memory 41 to the dedicated region 65 of the magnetic disk. As a result, even if the power supplied to the magnetic disk drive is shut off, records of the function assignment program and the firmware may be maintained.

The program that executes the function assignment process is split into suitable steps, and each time a particular step is completed, the MPU 43 sets up the associated flag bit 51. Even if power is shut off during the function assignment process, the MPU 43 may recognize the function assignment program steps that have already been performed, and may thus continue to perform the program steps that follow those which were completed before shutoff of power. In blocks 101 to 111, the function assignment process steps of the first stage are performed with the magnetic disk drive 10 remaining connected to the test apparatus 71. Since the function assignment process steps of the second stage are not completed, although the manufacture of the magnetic disk drive 10 is not yet finished, this disk drive is shipped in block 113.

The function assignment process steps of the second stage that are to be performed for the unfinished magnetic disk drive 10 shipped in block 113 may be performed at a shipping destination since the magnetic disk drive 10 itself is constructed so that these process steps may be performed even without a test apparatus or a specialized inspection person. In a typical example, an execution time for the function assignment process steps of the first stage is set to about one hour, and an execution time for the function assignment process steps of the second stage, to about 27 hours. The function assignment process may be performed by removing from the test chamber 73 the magnetic disk drive for which the function assignment process steps of the first stage have been completed, and then installing another magnetic disk drive in the cell. The test apparatus 71 and the test chamber 73 may therefore be improved in availability ratio, compared with a method that uses the test chamber at up to the second stage and assigns functions.

In block 115, the magnetic disk drive 10 is built into a host apparatus such as an HDD recorder or a file server, at the shipping destination. The host apparatus, although already assembled, remains to be tested for operation. In block 115, when the host apparatus is powered on and its operational tests are started, power is also supplied from the host apparatus to the magnetic disk drive 10, whereby the magnetic drive starts operating.

In block 117, the MPU 43 executes the initial operating program, refers to the flag bits 53, and operates in the function assignment mode. Furthermore, the MPU 43, after reading the function assignment program and the firmware from the dedicated region 65 out into the RAM 45, refers to the EEPROM 49, recognizes that a next function assignment process step is to write servo data into a region other than the dedicated region 65, and performs the process step. Although the host apparatus and the magnetic disk drive 10 operates independently of each other without performing command or data communications, the magnetic disk drive 10 executes the function assignment program in the operating environment of the host apparatus that will undergo vibration, changes in temperature, and other factors. Servo data writing entirely onto all recording surfaces of the magnetic disks 11, 12, is followed by execution of block 119, in which the function assignment process steps for using the entire magnetic disk are then performed as in block 109.

When the magnetic head is positioned, a servo control system of the magnetic disk drive 10 suffers the external shocks or vibration applied thereto, the spindle motor vibration occurring therein, or other disturbances. Examples of the objects controlled by the servo control system include the head support mechanism existing between the occurrence of an operations signal with respect to the voice coil 19 and generation of a head position signal from servo data by the read/write channel 29. Filters that process signals are also included. In general, the head support mechanism has its mechanical resonance frequency attenuated using a notch filter (band-pass filter) and/or low-pass filter of the read/write channel 29. A value of the mechanical resonance frequency, however, is affected by vibration of the host apparatus in which the magnetic disk drive is installed.

For example, if the host apparatus is an HDD recorder and in addition to the magnetic disk drive 10, a DVD drive with a rotational driving mechanism is mounted in the HDD recorder, a mechanical resonance frequency of the servo control system in the magnetic disk drive 10 is also affected by the vibration occurring when the DVD drive operates. Even if the magnetic disk drive 10 is installed in a test chamber and frequencies of the notch filter or of the low-pass filter are set, actual frequencies do not become the values that make the servo control system adaptable in optimum form inside the host apparatus different in environment. A servo control system adaptable in optimum form to actual operating conditions, however, may be constructed by, as in block 119, mounting the magnetic disk drive 10 in the host apparatus and then setting the frequencies of the above two filters in parallel with the operational tests of the host apparatus.

Even if the servo control system is of the learning type and has the ability to search for the optimum settings of frequencies after actually starting to operate in the host apparatus, the present embodiment is advantageous in that the servo control system may optimize its performance from the very beginning of operation. In block 121, test data read/write operations are performed on all data sectors and the magnetic disk drive 10 is tested for normal operation. Additionally, defective sectors are detected and the addresses thereof are stored into the PDM 57 in order to prevent these sectors from being used.

Even during a time interval from block 115 to block 121, the MPU 43 sets up the flag bits 51 in the EEPROM 49 each time a step of the function assignment program is completed. Thus, even if the power to the host apparatus is shut off during the function assignment process steps of the second stage, the MPU 43 may recognize the step of the function assignment process that is to be started when the power is turned back on. Instead of this, the MPU 43 may store the flag bits 51 into the ATA register of the HDC 37 so that the host apparatus may refer to the flag bits 51.

In block 123, after all function assignment process steps have been performed, the function assignment program sets up the appropriate flag bit 53 in the EEPROM 49 to specify the device mode for the MPU 43. Consequently, next time the magnetic disk drive 10 is turned on, the MPU 43 executes the initial operating program and after referring to the flag bits 53, reads the firmware from the dedicated region 65, and the parameters from the EEPROM 49, out into the RAM 45. Thus, the magnetic disk drive operates as a finished product.

Each dedicated region 65 is provided in a region that includes the innermost track at which servo data writing is started using the self-servo writing scheme. The storage region where the magnetic disk drive 10 being shipped is to store the firmware and the function assignment program does not always need to be a dedicated region inaccessible to a user, and may be a general-purpose region accessible to the user after the magnetic disk drive has become a finished product.

After the magnetic disk drive 10 has become a finished product, since there is no need to use the function assignment program, this program may be erased to increase the magnetic disks in storage capacity. The firmware, however, needs to be stored into a dedicated region to prevent overwriting by the user after the user has started using the firmware following completion of the manufacture of the magnetic disk drive 10 as a finished product. In block 111, if the firmware and the function assignment program are stored in a general-purpose region, a dedicated region is set in either region of the recording surfaces of the magnetic disk 11, 12. After this, only the firmware is moved to the dedicated region and the firmware and function assignment program that have remained stored on the magnetic disk until that time are erased. In addition, when another self-servo writing scheme is to be used to write servo data in self-propagating form from the outermost track in order, a dedicated region or a general-purpose region is provided in the region including the outermost track. Next, the servo data is written in block 107 and the firmware and the function assignment program are stored in block 111.

When power is turned on, the MPU 43 executes the initial operating program and refers to the flag bits 53 in the EEPROM 49 to judge whether the magnetic disk drive 10 is to execute the function assignment program or to operate as an original magnetic disk drive. The initial operating program is constructed so that in power-on timing of the magnetic disk drive 10 or the MPU assembly 31, the MPU 43 refers to the register that incorporates data relating to jumper connector setting. Therefore, the MPU 43 may likewise conduct the above judgment by referring to a particular setting of the jumper block 43. In the present embodiment, the majority of the function assignment process steps for the magnetic disk drive 10 may be performed inside the host apparatus. Therefore, since a manufacturer of the host apparatus may start operational tests after receiving a semi-finished magnetic disk in lieu of a finished one, operational testing of the host apparatus may be started earlier for a shorter manufacturing period if delivery of the magnetic disk drive is a critical path in the manufacturing process for the host apparatus. Furthermore, the parameters of the magnetic disk drive may be set to be the optimal values adaptable to the host apparatus in which the magnetic disk drive is to be mounted, and thus a high-performance magnetic disk drive may be completed.

Next, another embodiment is described. As shown in the flowchart of FIG. 4, part of servo data is written onto the recording surface 11a during a function assignment process step of the first stage and the remaining servo data is written under the operating environment of a host apparatus during a function assignment process step of the second stage. The servo data is written in this manner so that even if the power to the magnetic disk drive is shut off, associated locations may be used as storage locations for the firmware and function assignment program that were transferred from the test apparatus 71 to the memory buffer 41. However, increasing the capacity of the EEPROM 49 to such an extent that these programs may be stored, or storing the programs by providing an independent nonvolatile memory makes it unnecessary to write any servo data onto the magnetic disks during the function assignment process steps of the first stage. The function assignment process for such a magnetic disk drive may be performed by skipping the process steps of blocks 107 and 109 in the flowchart of FIG. 4 and writing servo data onto all recording surfaces in block 117.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive comprising:
a disk housed in the disk drive with a region in which servo data is written, and with another region in which servo data is not written, the disk storing a function assignment program into the region with servo data written therein;
a head that accesses the disk;
a processor located in the disk drive that executes the function assignment program; and
a state setter that, when electric power is supplied to the processor, sets up states for the processor to judge whether the processor is to execute the function assignment program,
wherein the function assignment program and the processor are used to configure the disk drive itself.

2. The disk drive according to claim 1, wherein the state setter includes a jumper block.

3. The disk drive according to claim 1, wherein the state setter includes a nonvolatile memory.

4. The disk drive according to claim 1, wherein the processor operates the disk drive in device mode in accordance with particular settings of the state setter.

5. The disk drive according to claim 1, wherein the function assignment program includes a program that writes servo data onto the disk using a self-servo writing mode.

6. The disk drive according to claim 1, wherein the function assignment program includes a program that registers defective sectors of the disk.

7. The disk drive according to claim 1, wherein the function assignment program includes a program that sets up parameters of a read/write channel.

8. The disk drive according to claim 1, wherein the region with servo data written therein includes the innermost track of the disk.

9. The disk drive according to claim 1, wherein the region with servo data written therein is a dedicated region inaccessible to a user.

10. A disk drive comprising:
a magnetic disk housed in the disk drive;
a head that accesses the magnetic disk;
a nonvolatile memory that stores a function assignment program;
a processor located in the disk drive that executes the function assignment program; and
a state setter that, when electric power is supplied to the processor, sets up states for the processor to refer to and correspondingly judge whether the processor is to execute the function assignment program,
wherein the function assignment program is used to configure the disk drive itself.

11. The disk drive according to claim 10, wherein servo data is written in all recording regions on recording surfaces of the disk and wherein the function assignment program includes a program that performs read/write tests on data sectors of the disk.

12. The disk drive according to claim 10, wherein servo data is not written in any recording regions on recording surfaces of the disk and wherein the function assignment program includes a program that writes servo data into the processor using a self-servo writing scheme.

13. The disk drive according to claim 10, wherein recording surfaces of the disk each have a region in which servo data is written, and another region in which servo data is not written, and wherein the function assignment program includes a program that writes servo data into the processor using a self-servo writing scheme.

14. The disk drive according to claim 10, wherein the function assignment program includes a program that registers defects-in-sectors of the disk.

15. The disk drive according to claim 10, wherein the function assignment program includes a program that sets up parameters of a read/write channel.

16. The disk drive according to claim 10, wherein the function assignment program includes a program that registers an execution state of the function assignment program in a register to which a host apparatus connected to the disk drive can refer.

17. A manufacturing method for a disk drive equipped with a recording medium having a function assignment program stored thereon, and with a processor for executing the function assignment program, the manufacturing method comprising:
assembling the disk drive into a host apparatus;
performing operational tests on the host apparatus; and
causing the processor to execute the function assignment program in at least one part of a period during which the host apparatus is being subjected to operational testing,
wherein the function assignment program is used to configure the disk drive itself.

18. The manufacturing method according to claim 17, wherein the function assignment program includes a program that writes servo data onto the disk using a self-servo writing scheme.

19. The manufacturing method according to claim 17, wherein the function assignment program includes a program that sets up a frequency of a filter provided in a read/write channel.

20. The manufacturing method according to claim 17, wherein the function assignment program includes a program that registers defective sectors of the disk.

* * * * *